(12) United States Patent
Ackermann

(10) Patent No.: US 7,998,449 B2
(45) Date of Patent: Aug. 16, 2011

(54) CARBON NANOTUBES PRODUCTION PROCESS

(76) Inventor: Heiko Ackermann, Weilheim (DE)

( * ) Notice: Subject to any disclaimer, the term of this patent is extended or adjusted under 35 U.S.C. 154(b) by 77 days.

(21) Appl. No.: 12/467,267

(22) Filed: May 16, 2009

(65) Prior Publication Data

US 2010/0290979 A1 Nov. 18, 2010

(51) Int. Cl.
*D01F 9/12* (2006.01)
(52) U.S. Cl. .............. 423/447.1; 423/445 B; 977/842; 204/157.42; 204/157.47
(58) Field of Classification Search .............. 423/445 B, 423/447.1, 447.2, 447.3; 977/734–741, 842–848; 204/157.4, 157.42, 157.43, 157.47
See application file for complete search history.

(56) References Cited

U.S. PATENT DOCUMENTS

| | | | | |
|---|---|---|---|---|
| 5,876,684 | A * | 3/1999 | Withers et al. | 423/445 B |
| 7,132,126 | B2 * | 11/2006 | Lee et al. | 427/220 |
| 7,671,113 | B2 * | 3/2010 | Pandit et al. | 523/322 |
| 2006/0239892 | A1 * | 10/2006 | Jeong et al. | 423/445 R |

OTHER PUBLICATIONS

Dai, Carbon Nanotubes: Synthesis, Integration, and Properties, Accounts of Chemical Research 2002; 35(12): 1035-1044.*
Dhas, Sonochemical Preparation of Hollow Nanospheres and Hollow Nanocrystals, J. Am. Chem. Soc. 2005; 127(8): 2368-2369.*
Oxley, et al., Ammonium nitrate: thermal stability and explosivity modifiers, Thermochimica Acta 2002; 384: 23-45.*
Margulis, et al., Mechanism of Sonochemical Reactions and Sonoluminescence, High Energy Chemistry 2004; 38(5): 285-294.*
Jeong, et al., A Sonochemical Route to Single-Walled Carbon Nanotubes under Ambient Conditions, J. Am. Chem. Soc. 2004; 126: 15982-15983.*
Su, et al., Cavitation luminescence in a water hammer: Upscaling sonoluminescence, Physics of Fluids 2003; 15(6): 1457-1461.*
Bergant, et al., Water hammer with column separation: A historical review, Journal of Fluids and Structures 2006; 22: 135-171.*
Wolfrum, Cavitation and shock wave effects on biological systems, Dissertation zur Erlangung des Doktorgrades der Mathematisch-Naturwissenschaftlichen Fakultaten der Georg-August-Universitat zu Gottingen (Gottingen 2004).*
Williams, et al., Pressure waves arising from the oscillation of cavitation bubbles under dynamic stressing, J. Phys. D: Appl. Phys. 1997; 30: 1197-1206.*

* cited by examiner

*Primary Examiner* — Daniel C. McCracken

(57) ABSTRACT

Methods of making nanoparticles are disclosed. The nanoparticles include carbon nanotubes and fullerenes, but the methods can be extended to produce other nanotubes, nanocrystals, proteins, nanospheres, etc. The disclosed methods generate cavitation in fluids to create the necessary conditions for nanoparticle formation. Disclosed methods for generating cavitation include explosions and oscillation of fluids.

5 Claims, 4 Drawing Sheets

CARBON NANOTUBES PRODUCTION PROCESS

CROSS-REFERENCE TO RELATED APPLICATIONS

Figure 1:
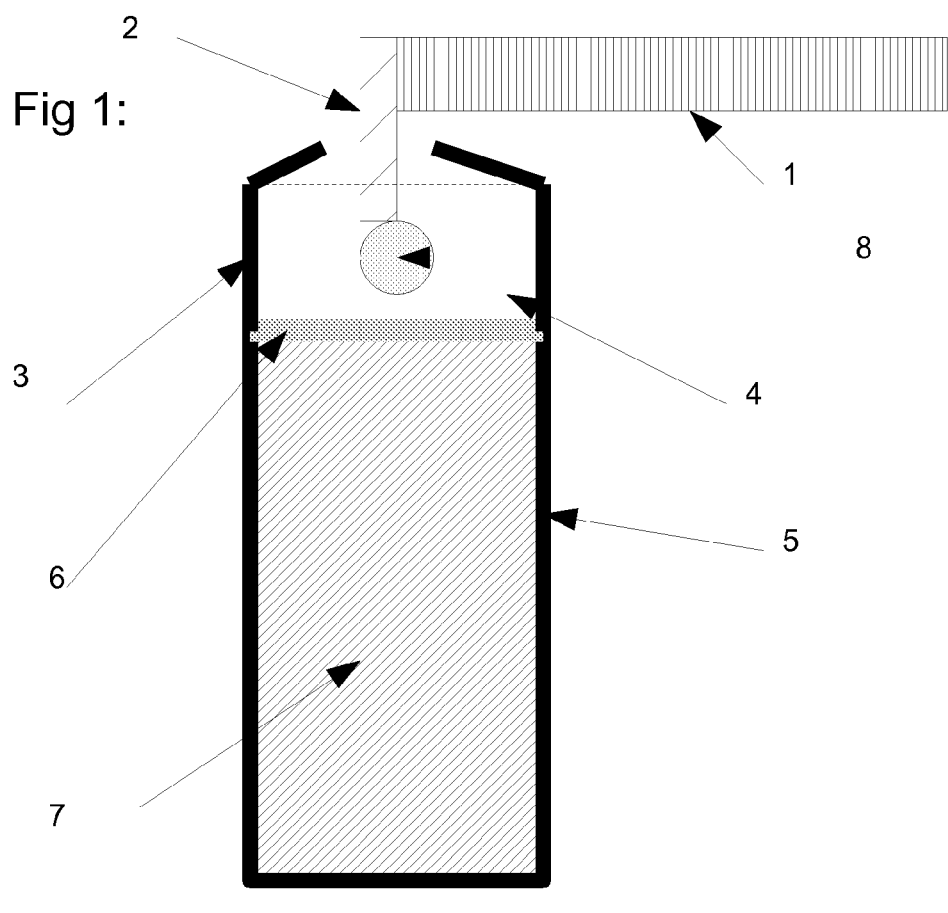

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION (1) Field of the Invention

The invention relates to the field of sonochemistry in general.

(2) Description of Related Art Including Information Disclosed Under 37 CFR 1.97 and 1.98.

Sonochemistry:

In chemistry, the study of sonochemistry is concerned with understanding the effect of sonic waves and wave properties on chemical systems. The chemical effects of ultrasound do not come from a direct interaction with molecular species. Studies have shown that no direct coupling of the acoustic field with chemical species on a molecular level can account for sonochemistry or sonoluminescence. Instead, sonochemistry arises from acoustic cavitation: the formation, growth, and implosive collapse of bubbles in a liquid. This is demonstrated in phenomena such as ultrasound, sonication, sonoluminescence, and sonic cavitation.

The influence of sonic waves traveling through liquids was first reported by Robert Williams Wood (1868-1955) and Alfred Lee Loomis (1887-1975) in 1927, but the article was left mostly unnoticed. Sonochemistry experienced a renaissance in the 1980s with the advent of inexpensive and reliable generators of high-intensity ultrasound.

Upon irradiation with high intensity sound or ultrasound, acoustic cavitation usually occurs. Cavitation—the formation, growth, and implosive collapse of bubbles irradiated, with sound—is the impetus for sonochemistry and sonoluminescence. Bubble collapse in liquids produces enormous amounts of energy from the conversion of kinetic energy of the liquid motion into heating the contents of the bubble. The compression of the bubbles during cavitation is more rapid than thermal transport, which generates a short-lived localized hot-spot. Experimental results have shown that these bubbles have temperatures around 5000 K, pressures of roughly 1000 atm, and heating and cooling rates above $10^{10}$ K/s. These cavitations can create extreme physical and chemical conditions in otherwise cold liquids. With liquids containing solids, similar phenomena may occur with exposure to ultrasound. Once cavitation occurs near an extended solid surface, cavity collapse is nonsphereical and drives high-speed jets of liquid to the surface. These jets and associated shock waves can damage the now highly heated surface. Liquid-powder suspensions produce high velocity interparticle collisions. These collisions can change the surface morphology, composition, and reactivity. Three classes of sonochemical reactions exist: homogeneous sonochemistry of liquids, heterogeneous sonochemistry of liquid-liquid or solid-liquid systemes, and, overlapping with the aforementioned, sonocatalysis. Sonoluminescence is typically regarded as a special case of homogeneous sonochemistry. The chemical enhancement of reactions by ultrasound has been explored and has beneficial applications in mixed phase synthesis, materials chemistry, and biomedical uses. Because cavitation can only occur in liquids, chemical reactions are not seen in the ultrasonic irradiation of solids or solid-gas systems. For example, in chemical kinetics, it has been observed that ultrasound can greatly enhance chemical reactivity in a number of systems by as much as a million-fold; effectively acting as a catalyst by exciting the atomic and molecular modes of the system (such as the vibrational, rotational, and translational modes). In addition, in reactions that use solids, ultrasound breaks up the solid pieces from the energy released from the bubbles created by cavitation collapsing through them. This gives the solid reactant a larger surface area for the reaction to proceed over, increasing the observed rate of reaction. Sonochemistry can be performed by using a bath (usually used for ultrasonic cleaning) or with a high power probe. The most significant problem of sonochemistry is the fact that is difficult to generate economically strong sonic waves in a liquid this is the reason why sonochemistry is only limited to very special applications. A brand new application for sonochemistry is the production of nanoparticles—such as carbon nanotubes, titanium nanocrystals etc. These nanoparticles can be used for a revolutionary new electronics, machines and materials. Because of the fact that these nanoparticles have a high purity for examples the from Soo-Hwan Jeong, Ju-Hye Ko, Jong-Bong Park, and Wanjun Park in their article "A Sonochemical Route to Single-Walled Carbon Nanotubes under Ambient Conditions," *J. Am. Chem. Soc.* 2004, 124, 15982-15983, described process uses a 0.01 mol % ferrocene-dissolved p-xylene solution to produce 60% pure Single walled carbon nanotubes. Other sonochemical processes are able to produce similar nanotubes of other materials as carbon. It is also able to produce or prepare nanocrystals described in "Sonochemical Preparation of Hollow Nanospheres and Hollow Nanocrystals" from Dhas and Suslick in *J. Am. Chem. Soc.* 2005, 127, 2368-2369. For these nanocrystals there exists a lot of different applications in medicine, photovoltaics etc.

Explosives:

An explosive Material is a material that either is chemically or otherwise energetically unstable or produces a sudden expansion of the material usually accompanied by the production of heat and large, changes in pressure (and typically also a flash and/or loud noise) upon initiation; this is called the explosion. An example for an explosive is ANFO (or AN/FO, for ammonium nitrate/fuel oil) is a widely used explosive mixture. ANFO under most conditions is considered a high explosive; it decomposes through detonation rather than deflagration and with a high velocity. It is a tertiary explosive consisting of distinct fuel and oxidizer phases and requires confinement for efficient detonation and brisance. Its sensitivity is relatively low; it generally requires a booster (e.g., one or two sticks of dynamite, as historically used, or, in more recent times, TOVEX) to ensure reliable detonation. However, an increase in the density of the mix can correspondingly increase ANFO's sensitivity. For this reason it is not always necessary to use High Explosives to detonate ANFO mixes. The explosive efficiency associated with ANFO is approximately 80% of TNT, also stated as (0.8) TNT equivalency. The most efficient mixed AN explosives using fuels other than fuel oil can exceed (1.6) TNT equivalency Gattling Gun:

The Gattling gun (1861) was one of the most well known rapid-fire weapons to be used in the 1860s by the Union forces of the Civil War, following the 1851 invention of the mitrailleuse by the Belgian Army. Although the first Gattling gun was capable of firing continuously, it required human power to crank it; as such it was not a true automatic weapon. Each barrel fired a single shot as it reached a certain point in the cycle after which it ejected the spent cartridge, loaded a new round, and in the process, cooled down somewhat. This configuration allowed higher rates of fire without the problem of an overheating single barrel. Some time later, Gaffing-type weapons were invented that diverted a fraction of gas from the chamber to turn the barrels. Later still, electric motors supplied external power. The gun was designed by the American inventor Dr. Richard J. Gattling in 1861 and patented in 1862. The Maxim gun, invented in 1884, was the first true automatic weapon, making use of the fired projectile's recoil force to reload the weapon.

Shallow Underwater Explosions:

If an explosive is detonated underwater there occurs an shock wave is the explosion is shallow the shock wave will be reflected by the water-air boundary and inverted causing a strong negative pressure this leads to very strong cavitation.

"Cavitation and shock wave effects on biological systems" by Bernhard Wolfrum is a dissertation where a shock lithotripter and ultrasonic contrast agents are used for generation cavitation through shock waves. It is shown that the effects are similar like Single Bubble Sonoluminescence.

Vibration Table:

A Vibration Table is table which is able to produce vibrations—mostly vertical vibrations.

This is done with a vibrational motor which generates a centripetal force, which is directed to a vertical excitation. These vibration tables are often used for generating emulsions.

Water Hammer Effect:

If the vertical oscillation of a liquid (water) is stronger than 2 G the water will be risen apart so that one part will flow up and the other part will flow down, so that large, cavities are formed. A detailed description can be found in Su, et al., "Cavitation luminescence in a water hammer: Upscaling sonoluminescence," Physics of Fluids 2003; 15(16): 1457-1461.

OBJECTS AND ADVANTAGES

The main advantage of the invention is that it describes are very simply method for generating shock wave induced cavitation for chemical processing. Further objects and advantages will become apparent from a consideration of the ensuing description and drawings.

BRIEF SUMMARY OF THE INVENTION

This invention combines two different research topics. One is the research field of shallow underwater explosions the other is the sonochemistry research field. The basic idea is to use a system similar a gattling gun to produce continuous explosions in a boundary liquid (a liquid which is separated through a layer from the main processing liquid) or directly in the processing liquid. The other idea is to use a vibration table to generate large amounts of cavities inside a liquid for producing nanoparticles such as fullerens, nanotubes, nanocrystals etc.

BRIEF DESCRIPTION OF THE SEVERAL VIEWS OF THE DRAWING(S)

Figure 2:
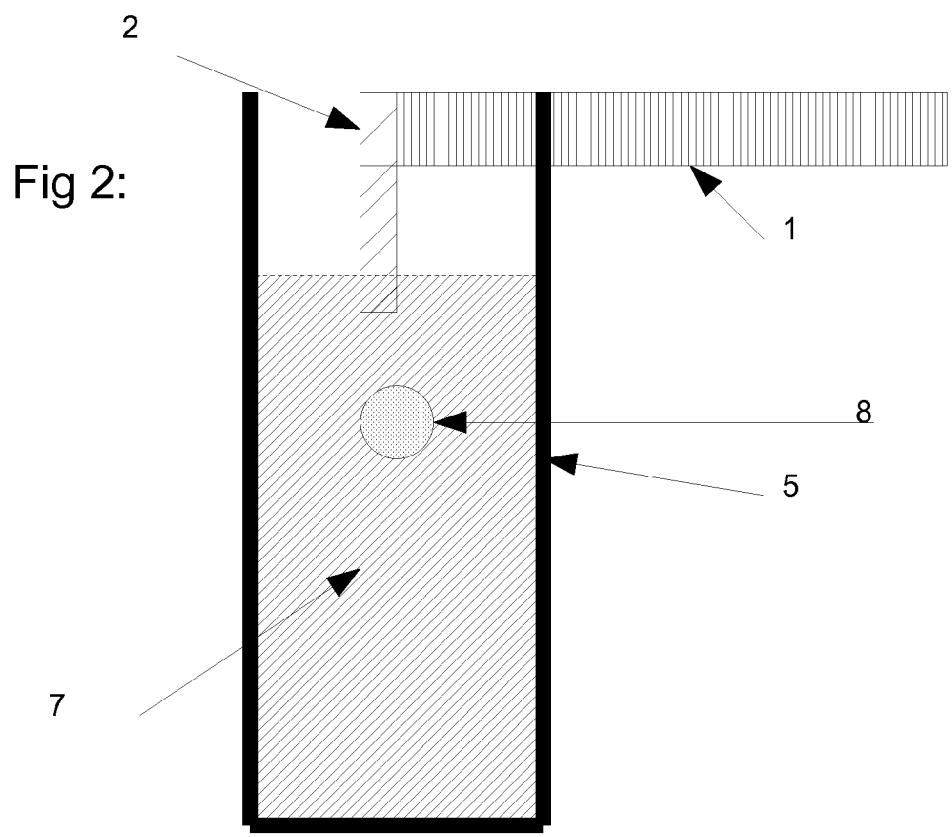
Figure 3:
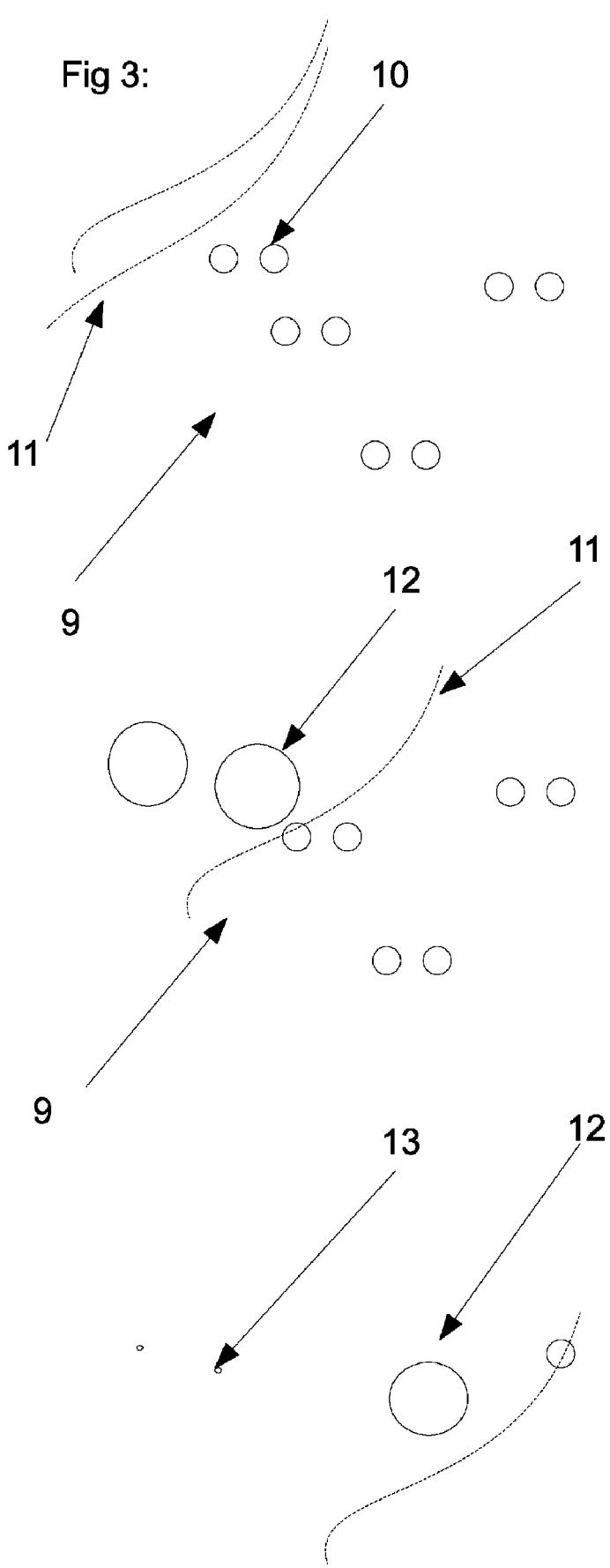
Figure 4:
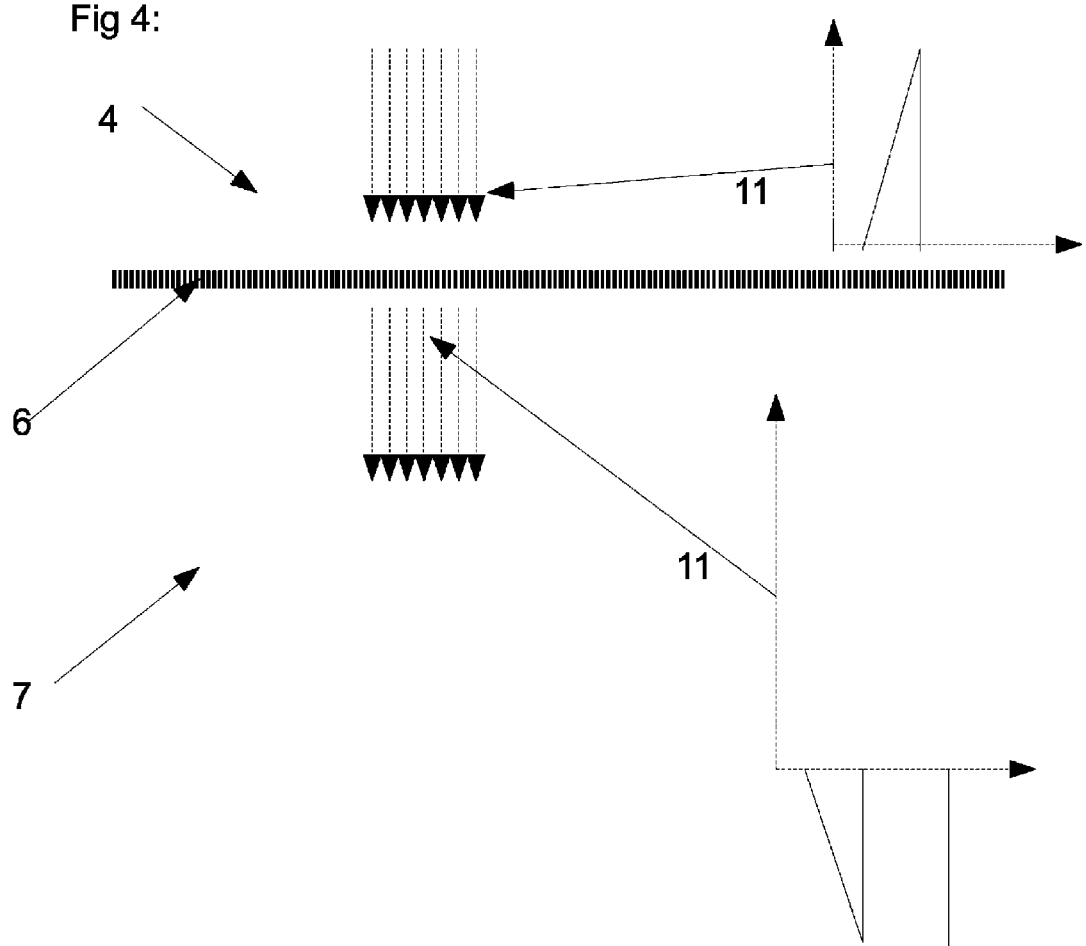
Figure 5:
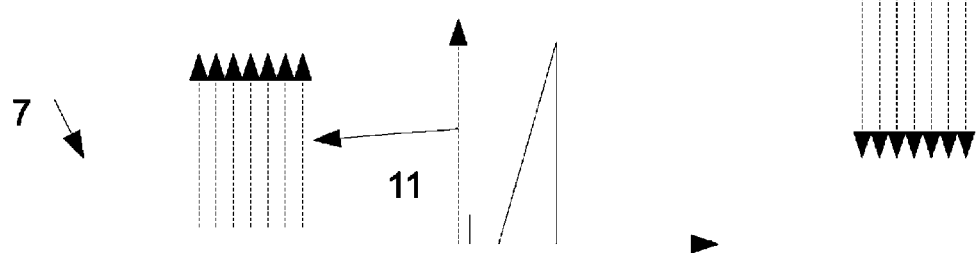
Figure 6:
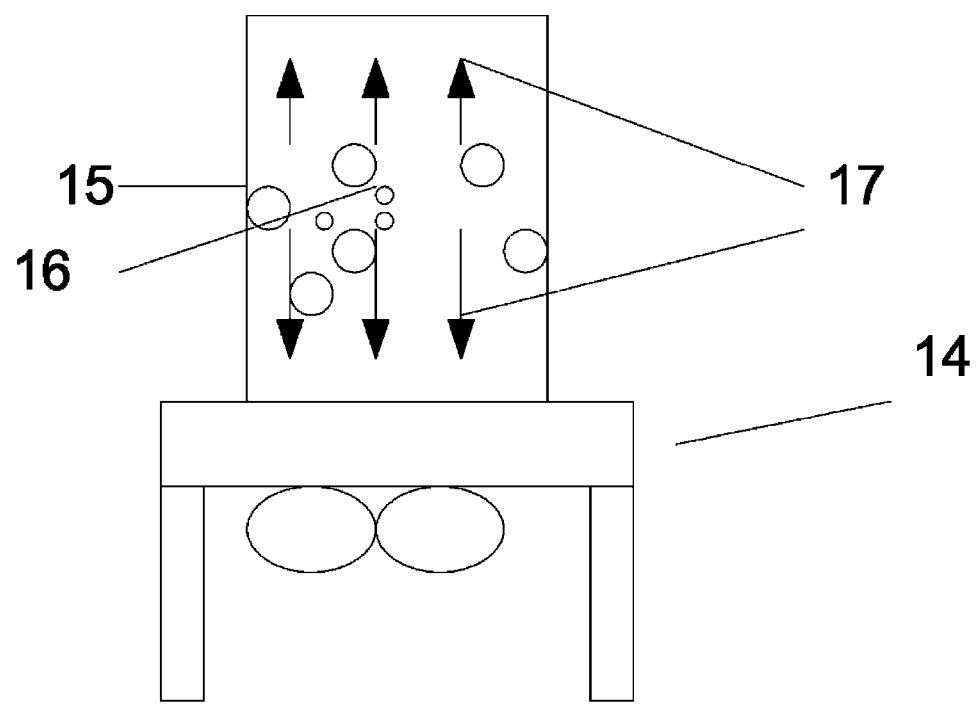

FIG. 1. shows the complete apparatus.
FIG. 2. shows an alternative embodiment of the invention.
FIG. 3. Shows a shock wave generating cavitation.
FIG. 4. Shows a shock through the boundary layer of the liquids.
FIG. 5. Shows a shock wave being reflected at the surface.
FIG. 6. Shows the other approach with a vibrational table.

REFERENCE NUMERALS

1 ANFO munition shells
2 Gattling device
3 Higher housing
4 liquid for shock wave generation in our case water
5 lower housing
6 plastic plate (boundary layer)
7 processing liquid in our case 0.01 mol % ferrocene-dissolved p-xylene solution with silica powder
8 explosion—shock wave source
9 processing liquid
10 gas bubble
11 shock wave
12 gas bubble after shock wave interaction
13 collapsing cavitation bubble
14 vibration table
15 cavity
16 collapsing cavity
17 direction of the fluid flow

DETAILED DESCRIPTION OF THE INVENTION

Preferred Embodiment

FIG. 1

Drawing one shows the complete apparatus. The invention consists of (1) ANFO explosive shells magazine, which is used in the gattling device (2). This gattling device is fastened to strong metal housing which consists of two different parts: a higher (3) and lower (5) housing. The two housings are separated by a plastic plate (6). Also two liquids are separated by the plastic plate: the chemical processing liquid (7) and the liquid in which the shock wave is generated (4).

Operation

Preferred Embodiment

FIG. 1, FIG. 3 and FIG. 4

The gattling device uses the ANFO munition to produce large underwater cavities and shock waves. These shock waves pass through the plastic plate. Because the plastic plate is denser than the water, the shock wave will be inverted. This means negative pressure (shown in FIG. 4).

These negative shock wave cause the gas bubbles in the processing liquid to expand and to collapse rapidly. When the processing liquid is a ferrocene dissolved p-xylene solution, cavitation causes sonochimcal reactions and the formation of single-walled carbon nanotubes.

Preferred Embodiment

FIG. 2

Drawing two shows the alternative device. It consists of an ANFO explosive shells (1) magazine, which is used in the gattling device (2). This gattling device is fastened to strong metal housing (5). Also a chemical liquid (7) for cavitation is inside the housing.

Operation

Preferred Embodiment

FIG. 2, FIG. 3 and FIG. 5

The gattling device uses the ANFO munition to produce large underwater cavities and shock waves. These shock waves are being reflected at the water-air boundary shown in FIG. 5. During this reflection, the pressure of the shock wave is being reflected. This causes cavitation and chemical reactions, shown in FIG. 3. The main disadvantage between this embodiment and embodiment 1 is that the explosions contaminate the solution.

Alternative Embodiment

FIG. 6

Drawing six shows the alternative embodiment consisting of a vibration table (14) filled with a liquid (7) (in our case 0.01 mol % ferrocene-dissolved p-xylene solution with silica). In this embodiment, liquid large cavities (15) are generated through the vertical vibration causing a different flow of the liquid (17). These cavities are collapsing (16) and causing chemical reactions.

CONCLUSION, RAMIFICATION AND SCOPE

Accordingly the reader will see that, according to the invention, I have provided a method for easily generating carbon nanotubes. While the above description contains many specificities, these should not be construed as limitations on the scope of the inventions, but as exemplifications of the embodiments. Many other ramifications and variations are possible. For example, if another liquid is used to cavitate, other chemical reactions occur. These reactions can also be easily used economically so the invention is not only limited for generating carbon nanotubes. It is also able to use it to produce other nanotubes, nanocrystals, proteins, nanospheres etc. All you have to do is customize the density of the plastic plate, the processing liquid and the shock wave generating liquid so that the shock waves will be inverted through traveling the plastic plate.

What is claimed is:

1. A method comprising generating cavitation in a fluid through vertical oscillations of the fluid to produce nanoparticles.
2. The method of claim 1, wherein the fluid comprises ferrocene and p-xylene.
3. The method of claim 2, wherein the fluid further comprises silica particles.
4. The method of claim 1, wherein the vertical oscillations are generated with a vibration table.
5. The method of claim 1, wherein the nanoparticles comprise fullerenes and/or carbon nanotubes.

* * * * *